US009229715B2

(12) United States Patent
Gschwind et al.

(10) Patent No.: US 9,229,715 B2
(45) Date of Patent: *Jan. 5, 2016

(54) METHOD AND APPARATUS FOR EFFICIENT INTER-THREAD SYNCHRONIZATION FOR HELPER THREADS

(71) Applicant: International Business Machines Corporation, Armonk, NY (US)

(72) Inventors: Michael K. Gschwind, Chappaqua, NY (US); John K. O'Brien, South Salem, NY (US); Valentina Salapura, Chappaqua, NY (US); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/899,145

(22) Filed: May 21, 2013

(65) Prior Publication Data

US 2013/0263145 A1 Oct. 3, 2013

Related U.S. Application Data

(63) Continuation of application No. 12/787,810, filed on May 26, 2010, now Pat. No. 8,468,531.

(51) Int. Cl.
*G06F 9/30* (2006.01)
*G06F 9/38* (2006.01)
(Continued)

(52) U.S. Cl.
CPC .......... *G06F 9/30087* (2013.01); *G06F 9/383* (2013.01); *G06F 9/3834* (2013.01); *G06F 9/3842* (2013.01); *G06F 9/3851* (2013.01); *G06F 9/52* (2013.01); *G06F 9/542* (2013.01); *G06F 9/4881* (2013.01); *G06F 9/5022* (2013.01)

(58) Field of Classification Search
CPC ............................. G06F 9/4881; G06F 9/5022
See application file for complete search history.

(56) References Cited

U.S. PATENT DOCUMENTS 7,328,433 B2   2/2008   Tian et al.
7,343,602 B2   3/2008   Luk et al.
(Continued)

OTHER PUBLICATIONS

Collins et al., Speculative Precomputation: Long-range Prefetching of Delinquent Loads, International Symposium on Computer Architecture, ISCA 2001.
(Continued)

*Primary Examiner* — Camquy Truong
(74) *Attorney, Agent, or Firm* — Scully, Scott, Murphy & Presser, P.C.; Daniel P. Morris, Esq.

(57) ABSTRACT

A monitor bit per hardware thread in a memory location may be allocated, in a multiprocessing computer system having a plurality of hardware threads, the plurality of hardware threads sharing the memory location, and each of the allocated monitor bit corresponding to one of the plurality of hardware threads. A condition bit may be allocated for each of the plurality of hardware threads, the condition bit being allocated in each context of the plurality of hardware threads. In response to detecting the memory location being accessed, it is determined whether a monitor bit corresponding to a hardware thread in the memory location is set. In response to determining that the monitor bit corresponding to a hardware thread is set in the memory location, a condition bit corresponding to a thread accessing the memory location is set in the hardware thread's context.

18 Claims, 4 Drawing Sheets

(51) Int. Cl.
*G06F 9/52* (2006.01)
*G06F 9/54* (2006.01)
*G06F 9/48* (2006.01)
*G06F 9/50* (2006.01)

(56) References Cited

U.S. PATENT DOCUMENTS

| | | |
|---|---|---|
| 2005/0223293 A1 | 10/2005 | Brock et al. |
| 2007/0088916 A1 | 4/2007 | Jacobson et al. |
| 2007/0113233 A1 | 5/2007 | Collard et al. |
| 2008/0126866 A1 | 5/2008 | Hopkinson |

OTHER PUBLICATIONS

Luk, Tolerating Memory Latency through Software-Controlled Pre-Execution in Simultaneous Multithreading Processors, International Symposium on Computer Architecture, ISCA 2001.

Tullsen et al., Simultaneous Multithreading: Maximizing On-Chip Parallelism, International Symposium on Computer Architecture, ISCA 1995.

Zhou et al., iWatcher: Simple and General Architectual Support for Software Debugging, International Symposium on Computer Architecture, ISCA 2004.

U.S. Office Action mailed Jul. 20, 2012 in related U.S. Appl. No. 12/787,810.

U.S. Office Action mailed Nov. 30, 2012 in related U.S. Appl. No. 12/787,810.

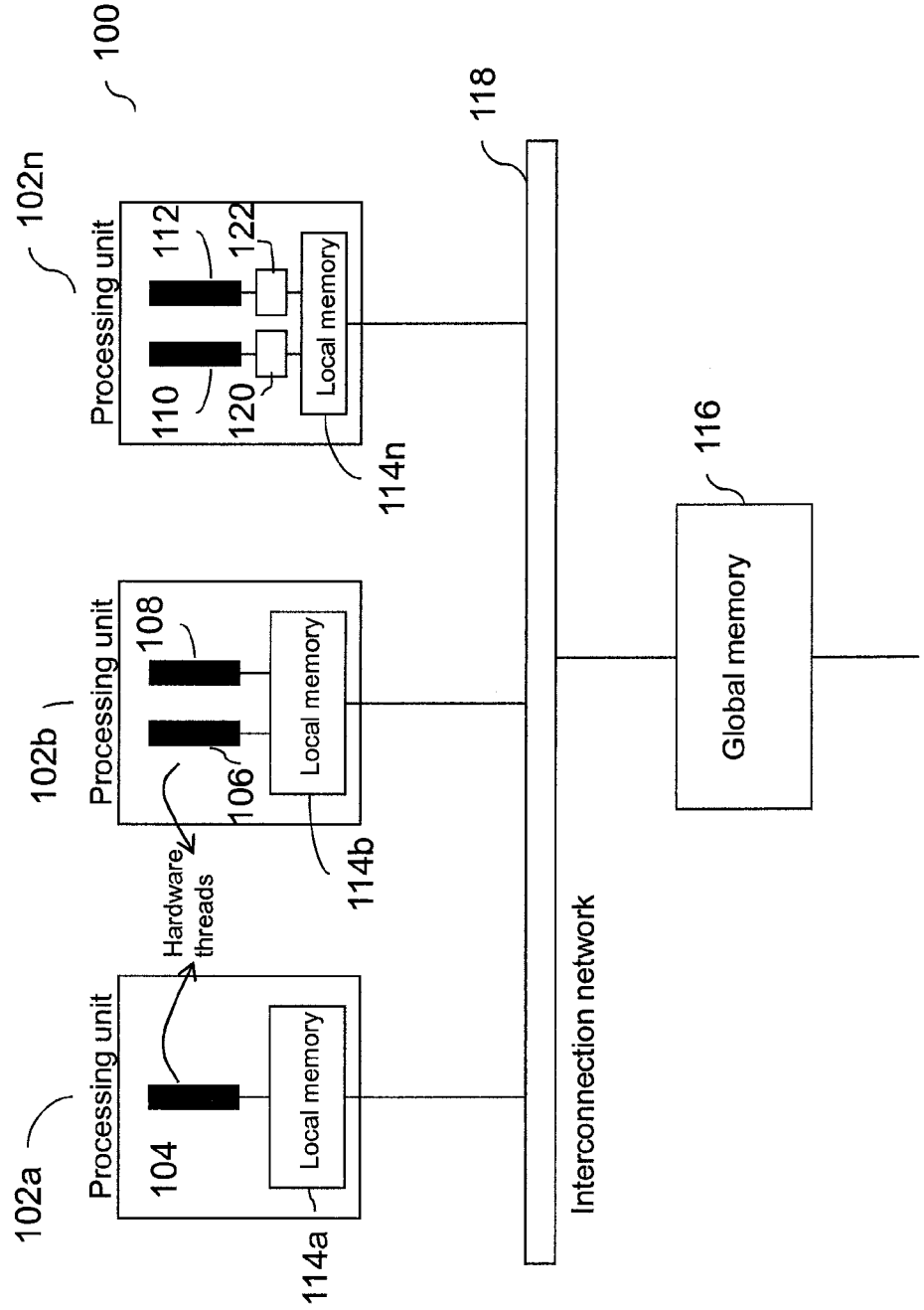

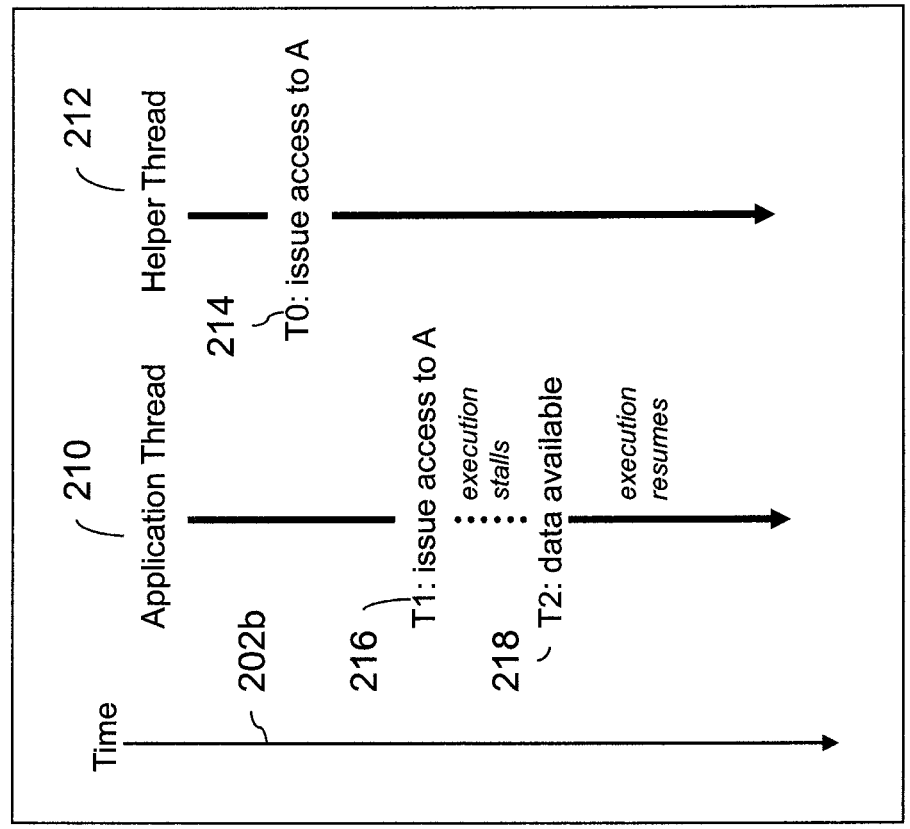
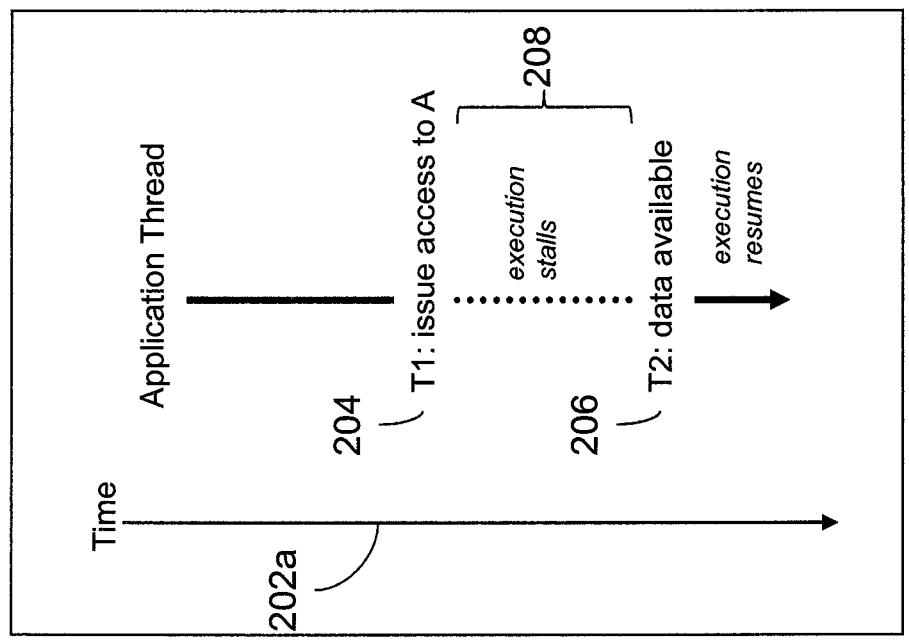
Fig. 2B
Fig. 2A

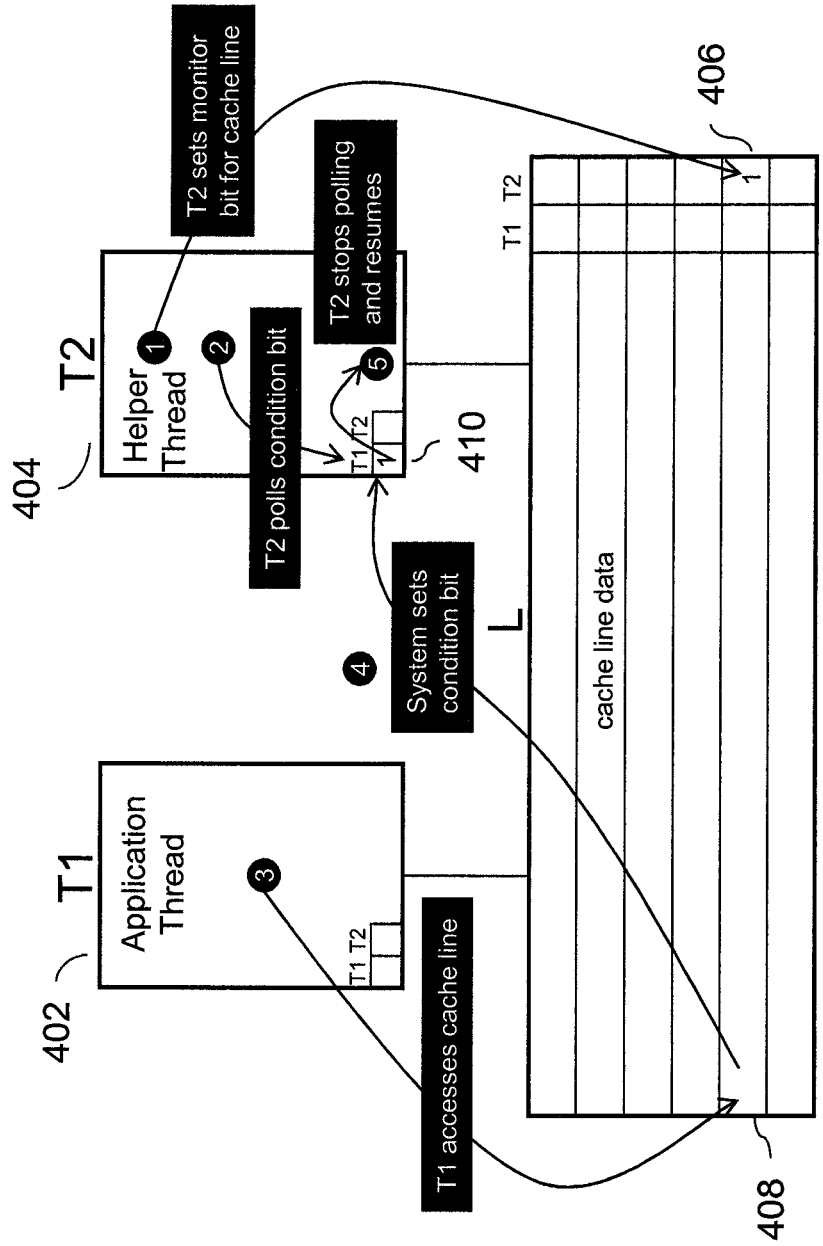

METHOD AND APPARATUS FOR EFFICIENT INTER-THREAD SYNCHRONIZATION FOR HELPER THREADS

RELATED APPLICATIONS

This application is a continuation of U.S. Ser. No. 12/787,810, filed May 26, 2010, the entire content and disclosure of which is incorporated herein by reference.

FIELD

The present disclosure relates generally to computer systems and thread synchronization, and more particularly to the enabling of fast, fine-grained synchronization between two hardware threads in a computing system.

BACKGROUND

A method for synchronizing multiple threads includes a main thread instructing a processor to start and stop another thread. This type of synchronizing, however, does not include hardware support to allow one thread to transparently monitor the progress of another. Without suitable hardware support, it is difficult to perform inter-thread synchronization at a fine granularity.

Another way to synchronize multiple threads uses memory-based mechanism in which the threads are synchronized when they reach a barrier. Each thread has an address, and on reaching that address, the corresponding cache line is invalidated and the execution of the thread is halted and monitored by a filter. Only after all threads reach the barrier, the filter releases accesses to the lower level memory hierarchy and the execution of all threads resumes. This mechanism, however, also does not provide for point-to-point fine grained synchronization, and requires the participation of all processors involved in the synchronization.

Known mechanisms that watch for accesses to specific memory addresses target to support program debugging facilities, but not inter-thread communication. Those mechanisms do not allow for watching for accesses from specific processors only. They also require involvement from the processor that accesses the memory address being watched.

Current methods for synchronization between two threads that are based on hardware support are for atomic updates, such as the PowerPC load-linked (lwarx) and store-conditional (stwcx) instructions. However, all current methods require participation by both the application thread and the helper thread, and this requires that the code for the application thread be modified, and that it executes with some overhead in order to enable synchronization with the helper thread.

BRIEF SUMMARY

A method and system for synchronizing threads are provided. The method, in one aspect, may include allocating a bit per hardware thread in a memory location, in a multiprocessing computer system having a plurality of hardware threads. The plurality of hardware threads share the memory location, and each of the allocated bit corresponds to one of the plurality of hardware threads. The method may also include allocating a condition bit for each of the plurality of hardware threads, the condition bit being allocated in each context of the plurality of hardware threads. The method may further include, in response to detecting the memory location being accessed, determining whether a bit corresponding to a hardware thread in the memory location is set. The method yet further may include, in response to determining that the bit corresponding to a hardware thread is set in the memory location, setting a condition bit corresponding to a thread accessing the memory location, in the hardware thread's context.

A system for synchronizing threads, in one aspect, may include a processor operable to run a plurality of hardware threads and a memory that the plurality of hardware threads share. A monitor bit may be allocated in the memory location per hardware thread, each of the allocated bit corresponding to one of the plurality of hardware threads. A condition bit for each of the plurality of hardware threads may be allocated in each context of the plurality of hardware threads. The processor in response to detecting the memory location being accessed, determines whether a monitor bit corresponding to a hardware thread in the memory location is set, and in response to determining that the monitor bit corresponding to a hardware thread is set in the memory location, sets a condition bit corresponding to a thread accessing the memory location, in the hardware thread's context.

A method of synchronizing threads, in another aspect, may include a monitoring thread setting a monitor bit allocated for the monitoring thread in a cache line of a shared cache memory to monitor access to the cache line. The method may also include a hardware controller detecting access to the cache line and identifying the monitoring thread that has the monitor bit set and identifying an accessing thread that accessed the cache line, and the hardware controller setting a condition bit allocated for the accessing thread in the monitoring thread's context.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 1 shows an example multicore processor architecture.

FIGS. 2A and 2B illustrate how data prefetching works with a helper thread in one embodiment of the present disclosure.

FIG. 4 illustrates how synchronization mechanism in one embodiment of the present disclosure is used by a helper thread performing data prefetching.

DETAILED DESCRIPTION

Figure 3:
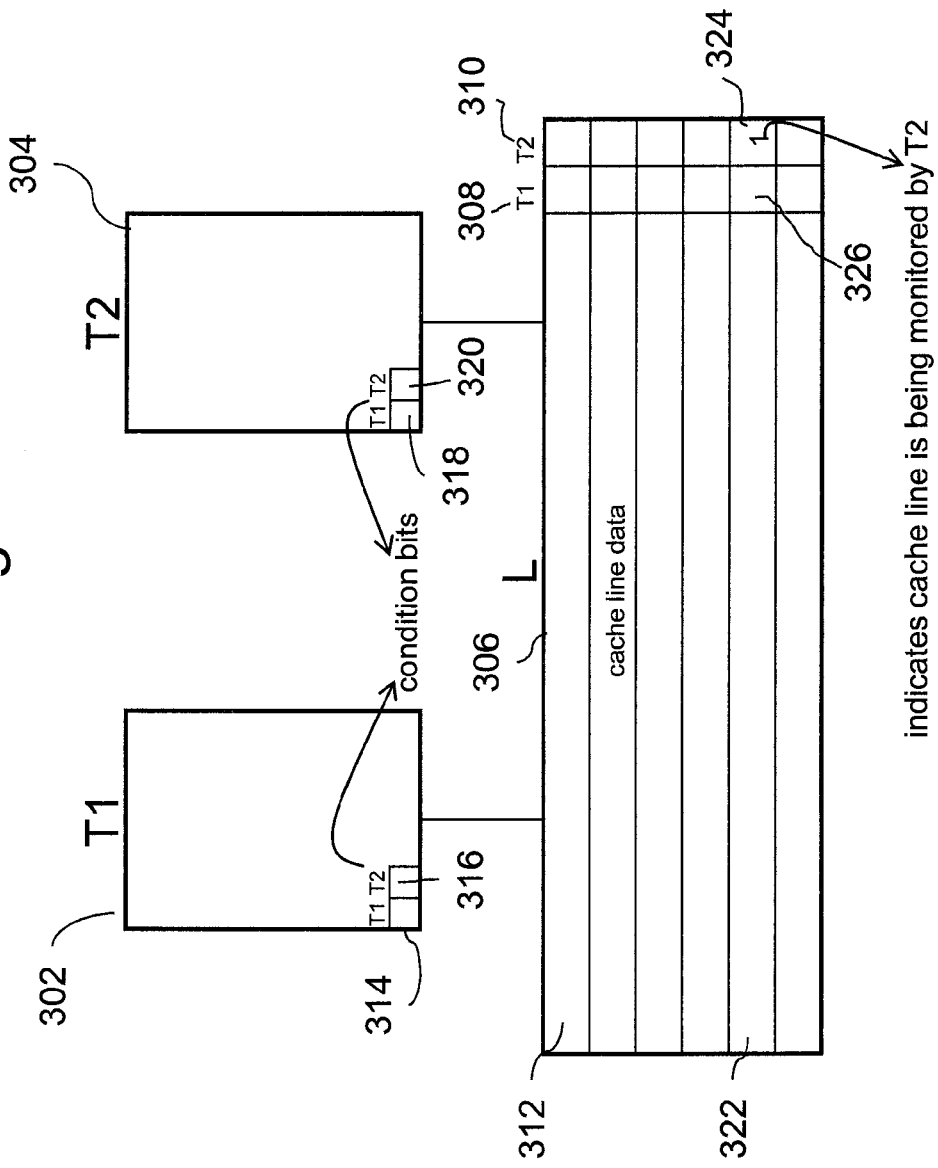
FIG. 3 shows a hardware implementation of a synchronization mechanism in one embodiment of the present disclosure.

The present disclosure, in one aspect, describes a mechanism to enable fast, fine-grained synchronization between two hardware threads, wherein one thread is able to monitor the progress of another thread by watching for specific memory accesses requested by the other thread. The mechanism is designed to be transparent to the thread that is being monitored. That is, the thread that is being monitored need not know and/or does not know whether it is being monitored. The mechanism may be applicable for use by a helper thread to synchronize with an application thread, without adversely impacting the performance of the application thread.

FIG. 1 shows an example architecture for a multicore processor that comprises of multiple processing units. Each processing unit (102a, 102b, . . . , 102n) of the multicore processor 100 supports one or more hardware thread(s) of execution (e.g., 104, 106, 108, 110, 112). The processing units (102a, 102b, . . . , 102n) share access to one or more levels of the memory hierarchy (114a, 114b, 114n, 116) through an interconnection network 118. Elements 120 and 122 may be a level of memory that is local to each hardware thread, which is not shared between hardware threads (110, 112) that are on the same processing unit. In one aspect of the present disclosure, the hardware changes in the memory implementation take effect at the first shared level of memory (e.g., 114n).

Briefly, computer memory hierarchy refers to storage devices organized into hierarchies in a computer memory system. Typically the memory hierarchy may range in the order from processor registers, to small and fast cache (e.g., static random access memory (SRAM)) nearby the processor, to main memory (e.g., dynamic random access memory (DRAM)), to hardware disk to tapes or the like. Also typically, as the level of the memory hierarchy goes down (e.g., from local in-process registers to cache, to main memory, to hard disks), the speed of access decreases but the storage capacity increases.

When an application does not exhibit enough parallelism to effectively use all available hardware threads, the extra threads can be used as helper threads to improve the performance of the application threads. The execution of the helper thread may be closely tied to the execution of the application thread that it is trying to speed up, and so the helper thread may need to synchronize with the application thread.

An example use of helper threads is for data prefetching. Data prefetching is a technique used to reduce the number of memory stalls, and thus improve performance. FIGS. 2A and 2B illustrate how data prefetching works with a helper thread. In the example shown in FIG. 2, the timeline (202a, 202b) progresses forward from top to bottom. FIG. 2A shows a single application thread with no helper thread. The application thread issues a memory access for memory address A at point T1 (204). The time interval (208) between T1 (204) and T2 (206) is spent fetching data from higher levels of the memory hierarchy into the cache closest to the processor. At point T2 (206), data from memory address A is available to the application thread, and it can use it for further computation.

FIG. 2B shows two hardware threads (210, 212): an application thread (210), and a helper thread (212) that performs data prefetching. In this example case, the helper thread (212) issues a memory access for address A at point T0 (214), which is earlier than point T1 (216) when the application thread issues its memory access. The corresponding data becomes available for the application thread to use at point T2 (218). Since the application thread (210) and helper thread (212) both have shared access to some level in the memory hierarchy, the earlier access issued by the helper thread (212) causes the time interval T1 to T2 to be reduced. As a result, the application thread waits for a shorter time for the memory access to complete, which can lead to better performance.

There are several advantages to using a separate thread to perform data prefetching. A prefetch code can handle arbitrary access patterns and can be modified to suit the needs of the target application or architecture, and an assist (helper) thread execution can asynchronously run-ahead and prefetch data for a large number of accesses. However, this asynchronous execution can be challenging as well, because it makes it necessary in some cases to synchronize with the application thread to ensure timely prefetch of data. For instance, prefetched data may dislodge useful data already present in the memory cache, and if prefetching is done too early or too late, it may degrade performance instead of improving it. A prefetch method should be able to efficiently synchronize the assist thread and the application thread at a fine granularity. Further, the assist thread should interfere as little as possible with the execution of the application thread.

In the present disclosure, a hardware mechanism is disclosed that can be exploited by software to perform fine-grained synchronization between two hardware threads that share some level of the memory hierarchy. This synchronization involves one thread watching for an access by the other thread to a specific memory location. When the other thread accesses the specific memory location, the shared level of memory automatically notifies the monitoring thread. The monitored thread is not required to perform any action other than the access that it would have performed in any case in its normal course of execution, and the synchronization is transparent to it.

FIG. 3 shows an implementation in one embodiment of a synchronization mechanism of the present disclosure. T1 (302) and T2 (304) are hardware threads and L (306) is the first level of memory cache that is shared between T1 (302) and T2 (304). In one embodiment, T1 (302) and T2 (304) may be threads on a single processor core that supports simultaneous multithreading, and L (306) may be an L1 cache, which T1 (302) and T2 (304) share. In another embodiment, T1 (302) and T2 (304) may be threads in separate processor cores in a chip multiprocessor, and L (306) may be an L2 cache, which T1 (302) and T2 (304) share. In one embodiment, one bit (e.g., 308, 310) per hardware thread may be used for each cache line (e.g., 312) in the shared cache (306). The bits (e.g., 308, 310) may be referred to as monitor bits for clarity and explanation sake. Briefly, a cache line refers to a unit of data that can be transferred between the cache memory and another memory. When a thread (e.g., 304) wants to watch for accesses to a memory location, it sets its own bit (e.g., 324) for the cache line (e.g., 322) that corresponds to the memory location. This bit can be set using a special hardware instruction, or by writing to a special register. In one embodiment, both read and write accesses are watched for. In another embodiment, only write accesses are watched for.

A set of condition bits (e.g., 314, 316, 318, 320) is introduced in each hardware thread context (e.g., 302, 304). Each bit (e.g., 314) in a set identifies one hardware thread. When a condition bit in a thread is set, it denotes that a cache line currently being watched by the thread has been accessed by the hardware thread identified by that condition bit. Upon a cache line access, the hardware automatically checks the cache line bits to determine if the cache line is being watched by any thread, and if so, the hardware sets the correct condition bit within the hardware thread context of the monitoring thread. For instance, consider the following example. T2 (304) may be interested in monitoring the cache line (322) access. T2 (304) thus may set its corresponding bit (324) at cache line (322). When a thread accesses the cache line (322), the hardware checks the cache line bits (e.g., 326, 324) to determine if one or more bits are set. For instance, an automated logic in the hardware may check the bit settings of the cache line bits. In the example shown in FIG. 3, a bit (324) corresponding to T2 is set. Thus, the hardware sets one of the condition bits (318, 320) in T2, based on which thread accessed the cache line (322). For example, if it was T1 (302) that accessed the cache line (322), the condition bit (318) corresponding to T1 is set in T2 context. In this way, T2 that is monitoring the access of a memory location can know when and/or which thread accessed that location. The information that tells which thread accessed the cache line is available to the hardware as part of the cache access request. Thus, by using hardware, the synchronization action is accomplished by a low-latency and efficient operation.

Speculative instructions are instructions that are executed, the result of which may not be needed. For instance, when a conditional branch instruction is encountered, the processor guesses which way the branch is most likely to go, and executes instructions from that point. In the case of out-of-order processors that support speculative instructions, speculative instructions cannot write to the cache shared between two processors, since, if a speculative instruction is flushed away, there would be no way to recover from its side-effects. In one embodiment of the present disclosure, to ensure that synchronization works in the presence of speculative instructions, the speculative instructions write to the shared cache only when they are at the head of the commit queue. In another embodiment, the store queue can be used to order accesses to shared memory. That is, the results of speculative instructions are not made visible at the shared cache level of memory; instead, they are buffered in the store queue within the hardware thread. Later in the execution, if the result of the speculative instruction is determined to be valid, the buffered store is written to shared memory, else it is discarded.

Data prefetching using helper threads is an example application for the disclosed synchronization mechanism. In this case, code generated for the helper thread is closely tied to the code for the application thread. To prefetch data in a timely manner, the helper thread may execute within a certain distance of the application thread. For this purpose, it needs to know where the application thread has reached in its execution. The helper thread code can independently compute the sequence of memory addresses that will be accessed in the application thread. It can monitor the application thread for accesses to specific memory addresses to determine the progress of the application thread execution, and pace itself accordingly.

FIG. 4 illustrates how the synchronization mechanism of the present disclosure in one embodiment may be used by a helper thread performing data prefetching. In the example shown in FIG. 4, the application thread runs on T1 (402) and the helper thread runs on T2 (404). T2 (404) first sets its own bit (406) in the cache line (408) that it wants to monitor for accesses by T1 (402). Then T2 (404) polls the set of condition bits within its context to watch for a change. Later, when T1 (402) accesses the cache line (408) being monitored, the hardware automatically sets the condition bit (410) corresponding to T1 within the set of bits in the context of T2. This indicates to the polling helper thread on T2 that T1 has accessed the cache line it was monitoring. T2 (404) can then reset the condition bits (e.g., 410) in its context, and take further action as appropriate.

The mechanism disclosed in the present application may provide low overhead and efficient way for threads to communicate and synchronize at a fine granularity of instruction point, for example, at the instruction point when a monitored thread is accessing a watched for cache line. The mechanism also allows for monitoring accesses from a specified thread only, while the thread whose accesses are being watched need not be aware that another thread is monitoring it. Thus, the watched thread may be transparent to the monitoring activities and its performance is not affected by the monitoring activity.

The hardware support that is disclosed herein is a general mechanism that can be used by any thread to efficiently and transparently synchronize itself with another thread. The thread that is doing the monitoring is notified of the activity of the thread being monitored, without interfering with or requiring any action from the thread that is being monitored. The mechanism only requires that the two threads share some level of memory, and that the synchronizing thread can determine the address of a memory access to be performed by the thread that it is synchronizing with. The synchronization mechanism of the present disclosure allows one thread to monitor progress of any other thread, and to resume execution when that other thread touches certain memory locations, without halting the execution of the monitored thread.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner (not shown), speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of synchronizing threads, comprising:
   allocating a bit per hardware thread in a memory location, in a multiprocessing computer system having a plurality of hardware threads, the plurality of hardware threads sharing the memory location, and each of the allocated bit corresponding to one of the plurality of hardware threads;
   allocating a condition bit for each of the plurality of hardware threads, the condition bit being allocated in each context of the plurality of hardware threads;
   in response to detecting the memory location being accessed, determining whether a bit corresponding to a hardware thread in the memory location is set;
   in response to determining that the bit corresponding to a hardware thread is set in the memory location, setting a condition bit corresponding to a thread accessing the memory location, in the hardware thread's context.

2. The method of claim 1, wherein the memory location is a cache line in cache memory.

3. The method of claim 2, wherein a helper hardware thread performing data prefetching for an application hardware thread sets the bit in the memory location to monitor the application hardware thread accessing the memory location.

4. The method of claim 3, wherein the helper hardware thread polls the condition bit after setting the bit in the cache line for monitoring.

5. The method of claim 4, wherein the helper hardware thread stops polling and resumes its processing in response to the condition bit in its context being set.

6. The method of claim 1, wherein the memory location access being monitored is read access, or write access, or combinations of both read and write access.

7. A program storage device readable by a machine, tangibly embodying a program of instructions executable by the machine to perform a method of synchronizing threads, comprising:
   allocating a bit per hardware thread in a memory location, in a multiprocessing computer system having a plurality of hardware threads, the plurality of hardware threads sharing the memory location, and each of the allocated bit corresponding to one of the plurality of hardware threads;
   allocating a condition bit for each of the plurality of hardware threads, the condition bit being allocated in each context of the plurality of hardware threads;
   in response to detecting the memory location being accessed, determining whether a bit corresponding to a hardware thread in the memory location are set;
   in response to determining that the bit corresponding to a hardware thread is set in the memory location, setting a condition bit corresponding to a thread accessing the memory location, in the hardware thread's context.

8. The program storage device of claim 7, wherein the memory location is a cache line in cache memory.

9. The program storage device of claim 8, wherein a helper hardware thread performing data prefetching for an application hardware thread sets the bit in the memory location to monitor the application hardware thread accessing the memory location.

10. The program storage device of claim 9, wherein the helper hardware thread polls the condition bit after setting the bit in the cache line for monitoring.

11. The program storage device of claim 10, wherein the helper hardware thread stops polling and resumes its processing in response to the condition bit in its context being set.

12. The program storage device of claim 7, wherein the memory location access being monitored is read access, or write access, or combinations of both read and write access.

13. A system for synchronizing threads, comprising:
    a processor operable to run a plurality of hardware threads;
    a memory, the plurality of hardware threads sharing the memory;
    a monitor bit allocated in the memory location per hardware thread, each of the allocated bit corresponding to one of the plurality of hardware threads; and
    a condition bit for each of the plurality of hardware threads, the condition bit allocated in each context of the plurality of hardware threads, wherein
    the processor in response to detecting the memory location being accessed, determining whether a monitor bit corresponding to a hardware thread in the memory location is set, and in response to determining that the monitor bit corresponding to a hardware thread is set in the memory location, setting a condition bit corresponding to a thread accessing the memory location, in the hardware thread's context.

14. The system of claim 13, wherein the memory location is a cache line in cache memory.

15. The system of claim 14, wherein a helper hardware thread performing data prefetching for an application hardware thread sets the monitor bit in the memory location to monitor the application hardware thread accessing the memory location.

16. The system of claim 15, wherein the helper hardware thread polls the condition bit after setting the monitor bit in the cache line.

17. The system claim 16, wherein the helper hardware thread stops polling and resumes its processing in response to the condition bit in its context being set.

18. The system of claim 14, wherein the memory location access being monitored is read access, or write access, or combinations of both read and write access.

* * * * *